(12) United States Patent
Laas et al.

(10) Patent No.: US 11,057,242 B2
(45) Date of Patent: *Jul. 6, 2021

(54) ADDRESS SYSTEM

(71) Applicant: Microsoft Technology Licensing, LLC, Redmond, WA (US)

(72) Inventors: Vahur Laas, Purje tee (EE); Ilja Morozov, Tallinn (EE); Rain Johanson, Tallinn (EE); Jonas Kaulakis, Tallinn (EE); Mati Kosemae, Peetri (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,476

(22) Filed: Jan. 27, 2020

(65) Prior Publication Data

US 2020/0162286 A1 May 21, 2020

Related U.S. Application Data

(63) Continuation of application No. 13/568,519, filed on Aug. 7, 2012, now Pat. No. 10,594,511.

(30) Foreign Application Priority Data

Jun. 6, 2012 (GB) .................................... 1209987

(51) Int. Cl.
*H04L 12/46* (2006.01)
*H04L 29/12* (2006.01)
*H04L 29/08* (2006.01)

(52) U.S. Cl.
CPC ...... *H04L 12/4625* (2013.01); *H04L 61/1511* (2013.01); *H04L 67/303* (2013.01); *H04L 61/3045* (2013.01)

(58) Field of Classification Search
CPC ............. H04L 12/4625; H04L 61/1511; H04L 67/303; H04L 61/3045
See application file for complete search history.

(56) References Cited

U.S. PATENT DOCUMENTS

2005/0235044 A1* 10/2005 Tazuma ............ H04L 29/12066
709/217
2009/0327517 A1* 12/2009 Sivasubramanian ... H04L 67/02
709/238

(Continued)

FOREIGN PATENT DOCUMENTS

| CN | 1599346 A | 3/2005 |
|---|---|---|
| CN | 100525242 C | 8/2009 |

(Continued)

OTHER PUBLICATIONS

"First Office Action and Search Report Issued in Chinese Patent Application No. 201910863933.6", (w/ Concise Statement of Relevance), dated Mar. 16, 2021, 15 Pages.

*Primary Examiner* — Minh Chau Nguyen
(74) *Attorney, Agent, or Firm* — Schwegman Lundberg & Woessner, P.A.

(57) ABSTRACT

Device, address system and computer program product for routing data from the device to an endpoint over a network. The device executes an instance of a client for routing the data. An address query for requesting a network address of the endpoint is formed in dependence on the type of the client instance, and the address query is sent to the address system. The address system determines an endpoint address based on the address query such that the endpoint address is dependent upon the type of the client instance and sends the endpoint address to the device. Data is then routed from the device to the endpoint address over the network.

20 Claims, 4 Drawing Sheets

(56) References Cited

U.S. PATENT DOCUMENTS

2012/0179801 A1\* 7/2012 Luna ................... H04L 61/1511
709/223
2015/0074221 A1\* 3/2015 Kuparinen ........ H04L 29/12132
709/214

FOREIGN PATENT DOCUMENTS

CN 101552723 A 10/2009
CN 102112980 A 6/2011

\* cited by examiner

ADDRESS SYSTEM

RELATED APPLICATION

This application is a continuation application of U.S. patent application Ser. No. 13/568,519, filed Aug. 7, 2012, which application claims priority under 35 USC 119 or 365 to Great Britain Application No. 1209987.5 filed 6 Jun. 2012, which applications are incorporated herein by reference in their entirety.

TECHNICAL FIELD

The present invention relates to an address system. In particular, the present invention relates to routing data to an endpoint of a network using an address system.

BACKGROUND

Communication systems allow a user of a device to communicate across a network. For example, the communication system may be a packet based communication system allowing users of devices such as personal computers, mobile phones, tablets and TVs to communicate across the Internet. To enable access to a communication system, communication client software may be provided by a software provider and installed on a user's device. The client software allows the user to register with the communication system and communicate over the communication system. The user's device may communicate with other endpoints of the network such as other user devices or servers of the communication system. Different types of client instances may be installed at the user device. For example, different types of client instances may be installed for execution on different platforms (e.g. different operating systems) which may be implemented at a device. The software provider may update the client software, e.g. to introduce new and/or improved functionality in a new version of the client software. Therefore different types of client instances may have different version and/or build numbers. The build number of the client increments for each change to the code of the client software. The version number of the client increments when the functionality of the client changes. A change to the build number generally signifies a smaller change to the client software than a change to the version number. In this way, the build numbers may be considered to be subdivisions of the version numbers. Preferably, different types of client instance can communicate with each other over the network.

In order for a client instance implemented at a device to communicate over the network with an endpoint (e.g. another device or a server of the network), the client instance first determines the network address of the endpoint. As an example, where the network is the Internet, the network address may be an IP address of the endpoint. When the client instance has determined the network address of the endpoint, it can route data over the network to the endpoint. In order to determine the network address of the endpoint, the client instance may send an address query to an address system of the network, and in response the address system may return an answer to the address query which includes the network address of the endpoint. For example, the address system may be a domain name system and the address query may be a Domain Name System (DNS) query. The domain name system is a hierarchical distributed naming system for resources connected to the Internet or a private network. The DNS query includes the domain name (e.g. www.skype.com) of an endpoint to which the client instance intends to connect. The domain name system resolves the DNS query into an IP address corresponding to the domain name in the DNS query and returns the IP address to the client instance at the device. A domain name is easier than an IP address for a user to understand and remember.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Different types of client instances may be routed to different endpoints. This may be achieved by the client instance forming an address query (e.g. DNS query) in dependence upon the type of the client instance. For example, the platform ID, client version and build number may be included in the address query. In one example, the platform ID, client version and build number are placed in reverse order and dot separated in a DNS query. The address system (e.g. domain name system) may store relationships for mapping address queries to network addresses, wherein the stored relationships distinguish between address queries formed in dependence on different types of client instance. For example, a first DNS query including a first platform ID may be mapped to a different IP address than that to which a second DNS query including a second platform ID is mapped. This allows the address system to determine an endpoint address which is dependent upon the type of client instance executed at the device.

There may therefore be provided a method to route connecting clients by their type (e.g. platform, version or build number) to different endpoints. The endpoints may be server endpoints or user device endpoints in the network. For example, the endpoint address may relate to a real server in the network. However, the endpoint address may not relate to a real entity (e.g. a real server) in the network. Using an address which does not relate to a real entity in the network enables a controller of the communication system (e.g. the client software provider) to prevent client instances of particular types (e.g. badly behaving clients) from communicating with particular, real endpoints in the network. Furthermore, data from particular types of client instance may be routed to different server endpoints, for example data from beta clients may be routed to staging environments for testing.

BRIEF DESCRIPTION OF THE DRAWINGS

For a better understanding of the various embodiments and to show how the same may be put into effect, reference will now be made, by way of example, to the following drawings in which.

DETAILED DESCRIPTION

Figure 1:
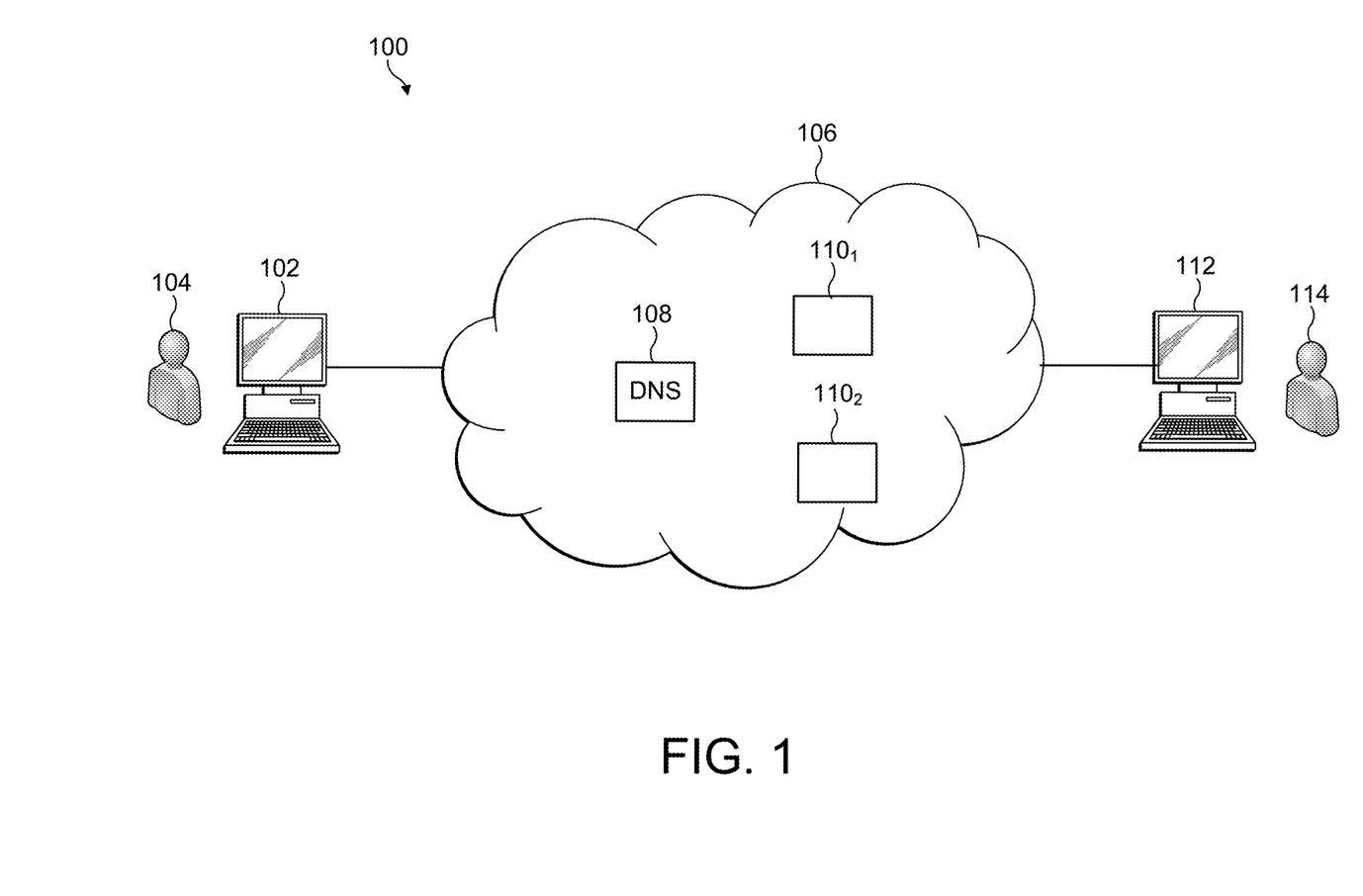
FIG. 1 shows a communication system including two user devices.

FIG. 1 shows a communication system 100 comprising a first user 104 who is associated with a first user device 102 and a second user 114 who is associated with a second user device 112. In other embodiments the communication system 100 may comprise any number of users and associated user devices. The user devices 102 and 112 can communicate over the network 106 in the communication system 100, thereby allowing the users 104 and 114 to communicate with each other over the network 106. The communication system 100 includes servers in the network 106. FIG. 1 shows the network 106 including a domain name system server 108 and two other servers $110_1$ and $110_2$, although there may be more, or fewer, servers in the network 106 than those shown in FIG. 1. The communication system 100 shown in FIG. 1 is a packet-based communication system, but other types of communication system could be used. The network 106 may, for example, be the Internet. Each of the user devices 102 and 112 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 102 is arranged to receive information from and output information to the user 104 of the user device 102. The user device 102 comprises output means such as a display and speakers. The user device 102 also comprises input means such as a keypad, a touch-screen, a microphone for receiving audio signals and/or a camera for capturing images of a video signal. The user device 102 is connected to the network 106.

The user device 102 executes an instance of a communication client, provided by a software provider associated with the communication system 100. The communication client is a software program executed on a local processor in the user device 102. The client performs the processing required at the user device 102 in order for the user device 102 to transmit and receive data over the communication system 100.

The user device 112 corresponds to the user device 102 and executes, on a local processor, a communication client which corresponds to the communication client executed at the user device 102. The client at the user device 112 performs the processing required to allow the user 114 to communicate over the network 106 in the same way that the client at the user device 102 performs the processing required to allow the user 104 to communicate over the network 106. The user devices 102 and 112 are endpoints in the communication system 100. FIG. 1 shows only two users (104 and 114) and two user devices (102 and 112) for clarity, but many more users and user devices may be included in the communication system 100, and may communicate over the communication system 100 using respective communication clients executed on the respective user devices. The servers $110_1$ and $110_2$ are also endpoints in the communication system 100.

A domain name system is implemented on the network 106 in order to map domain names to IP addresses. The domain name system is a hierarchical distributed naming system for resources connected to the network 106. The domain name system includes a number of servers, such as DNS server 108, which carry out the processing required to map domain names to IP addresses.

Figure 2:
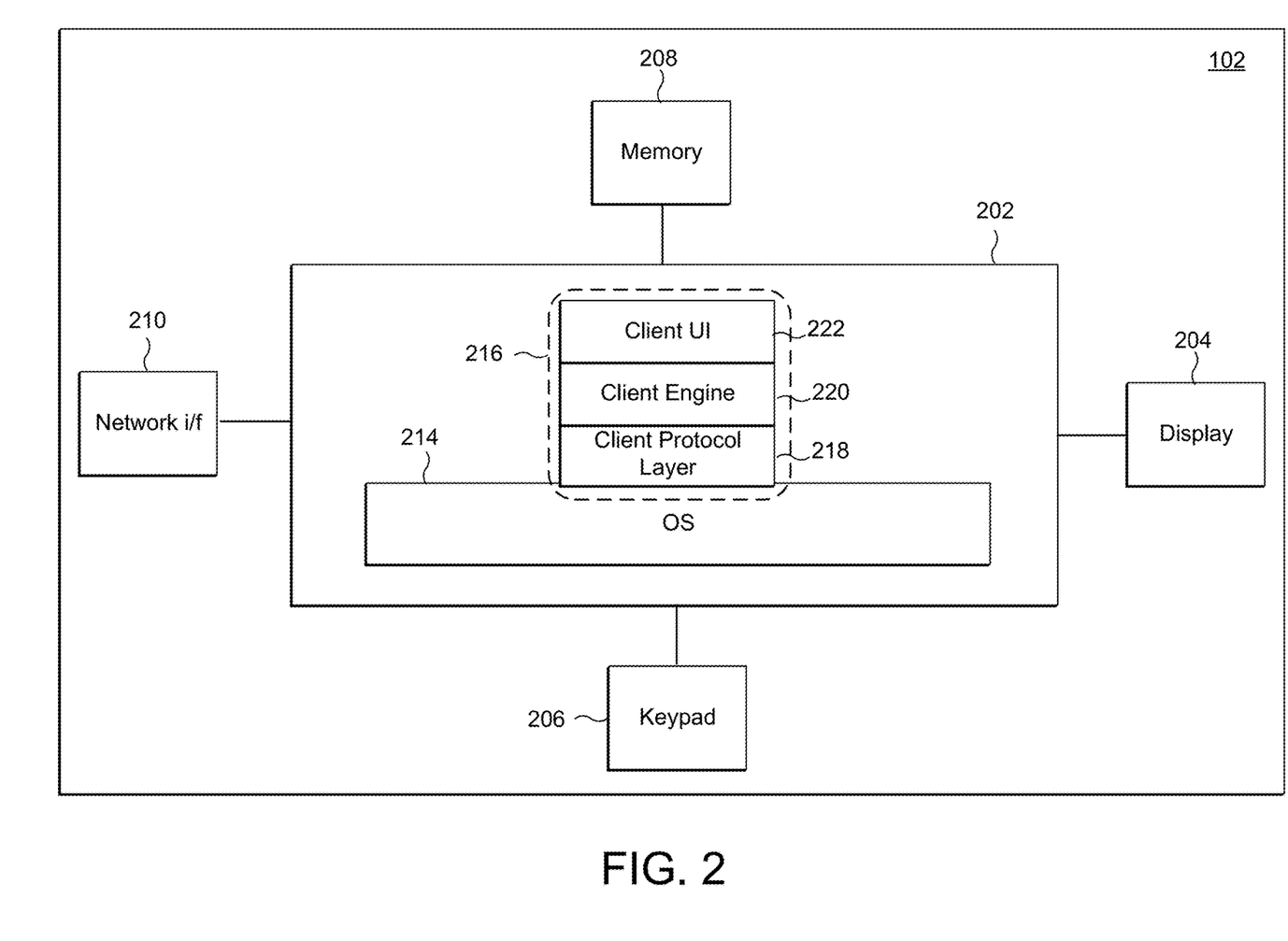
FIG. 2 shows a schematic view of a user device.

FIG. 2 illustrates a detailed view of the user device 102 on which is executed a communication client instance for communicating over the communication system 100. The user device 102 comprises a central processing unit ("CPU") or "processing module" 202, to which is connected: output devices such as a display 204, which may be implemented as a touch-screen; input devices such as a keypad 206; a memory 208 for storing data; and a network interface 210 such as a modem for communication with the network 106. The user device 102 may comprise other elements than those shown in FIG. 2. The display 204, keypad 206, memory 208 and network interface 210 may be integrated into the user device 102 as shown in FIG. 2. In alternative user devices one or more of the display 204, the keypad 206, the memory 208 and the network interface 210 may not be integrated into the user device 102 and may be connected to the CPU 202 via respective interfaces. One example of such an interface is a USB interface. If the connection of the user device 102 to the network 106 via the network interface 210 is a wireless connection then the network interface 210 may include an antenna for wirelessly transmitting signals to the network 106 and wirelessly receiving signals from the network 106.

FIG. 2 also illustrates an operating system ("OS") 214 executed on the CPU 202. Running on top of the OS 214 is a software stack 216 for the client software of a client instance of the communication system 100. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 106 via the network interface 210. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 104 via the user interface of the client and to receive information from the user 104 via the user interface.

Figure 3:
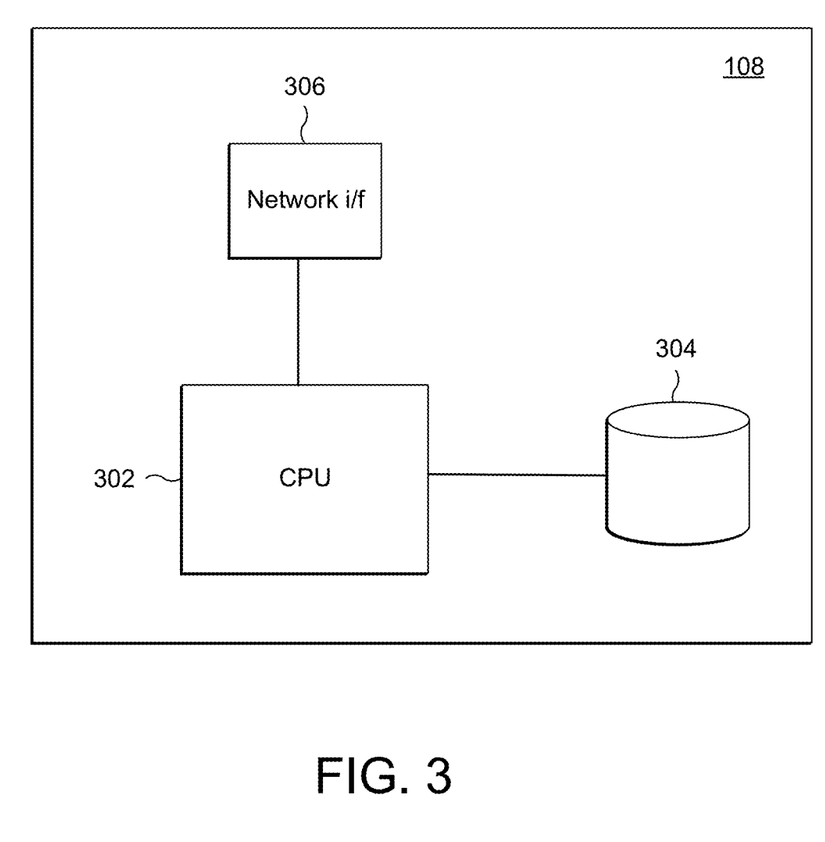
FIG. 3 shows a schematic view of a domain name system server.

FIG. 3 illustrates a detailed view of the DNS server 108 which receives and responds to DNS queries from user devices in the communication system 100. For clarity, in the examples described herein the domain name system includes only one server, that being the DNS server 108. However, in alternative embodiments the domain name system may include a plurality of DNS servers in the network 106, which may share the burden of handling DNS queries. The DNS server 108 comprises a central processing unit ("CPU") or "processing module" 302, to which is connected a memory storing a database 304, and a network interface 306 such as a modem for communication with the network 106. The DNS server 108 may comprise other elements than those shown in FIG. 3. The database 304 stores relationships which map DNS queries to IP addresses. The DNS server 108 is configured to receive a DNS query from the device 102, use the relationships stored in the database 304 to determine an IP address corresponding to a domain name in the DNS query, and to send an answer to the device 102 including the determined IP address.

Figure 4:
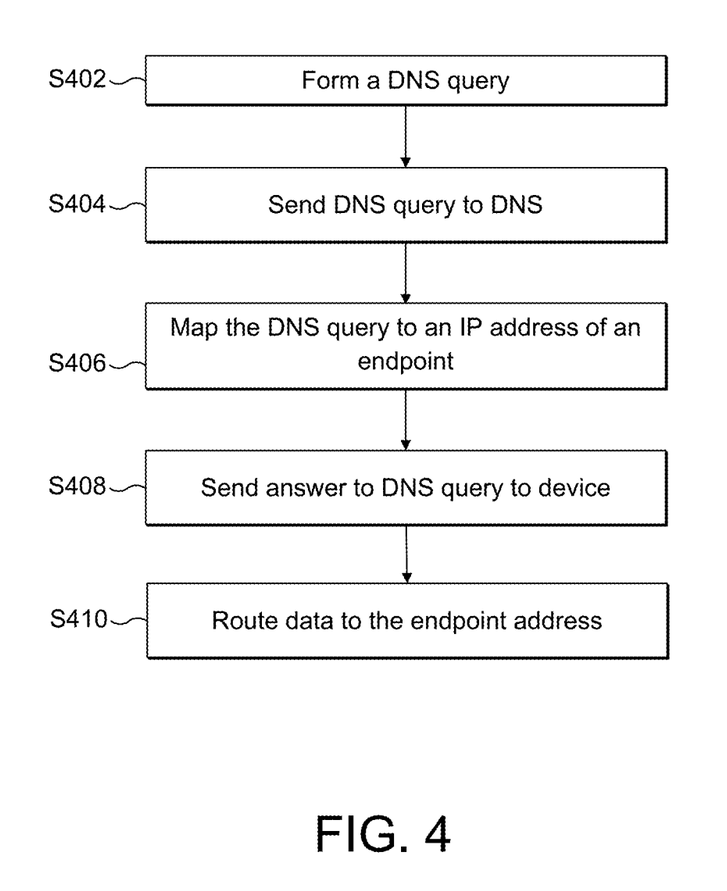
FIG. 4 is a flow chart for a process of routing data to an endpoint address.

With reference to the flow chart shown in FIG. 4 there is now described a method by which the device 102 routes data to an endpoint address in the network 106. In the example described below, the endpoint to which data is routed is the server $110_1$, which is a backend server of the communication system 100. However, in other examples, the endpoint could be another server in the network 106 or could be a different network node such as a user device in the network 106. The client instance executed at the device 102 determines the IP address of the server $110_1$ using the domain name system.

In step S402 the client executed at the device 102 forms a DNS query for requesting the IP address of the server $110_1$ from the domain name system. Methods described herein provide functionality for routing different types of client instances (e.g. with different version numbers) to different servers or even to addresses of non-existing servers in the network 106. In order to achieve this, the DNS query is formed in step S402 in dependence on the type of the client instance executed at the device 102. In other words, the DNS query is formed in step S402 based on the type of the client instance executed at the device 102.

The client forms a version string based on the client instance and uses the version string and an address suffix to form the DNS query. In this way, the client uses the version string as one component to compute a domain name to be included in the DNS query. The version string includes a platform ID of the platform on which the client is executed at the device 102, and the version number and the build number of the client instance executed at the device 102. The platform may include a hardware architecture and a software framework (including application frameworks), which allows the client software to execute. The platform may define a computer's architecture, operating system, programming languages and/or related user interface (e.g. runtime system libraries or graphical user interface). For example, one platform may be used when the device 102 is a mobile device such as a mobile phone (e.g. having relatively low processing and display capabilities) whereas another platform may be used when the device 102 is a fixed device such as a PC (e.g. having relatively high processing and display capabilities), and yet another platform may be used when the device 102 is a television (e.g. having relatively low processing capabilities but relatively high display capabilities).

In embodiments described herein, the version string has the following format:

[platform_id]/[version number].[build number], where platform_id is numerical value (such as 10021) which indicates the platform on which the client instance is executed at the device 102, version number has multiple numbers separated by dots (such as 1.2.0) which indicate the version of the client instance, and build number has a numerical value (such 402) which indicates the specific build of the client instance. Therefore, in one example, the version string will be 10021/1.2.0.402. In other embodiments the type of the client instance may be indicated in a different manner, e.g. using a version string which has a different format.

In order to compute a DNS name for the DNS query, the client executed at the device 102 reverses the order of the dot (".") or slash ("/") separated numbers in the version string and forms a dot separated array of numbers. For example if the client version string is 10021/1.2.0.402 that step produces the array of numbers: 402.0.2.1.10021. The client will then add a configured domain suffix to the array of numbers to form the DNS query. For example, if the configured domain suffix is "rst.skype.net" then the resulting DNS query may be: 402.0.2.1.10021.rst.skype.net.

In step S404 the DNS query formed in step S402 is sent to the domain name system in the network 106. In this example, the DNS query is sent to the DNS server 108. The DNS query is sent over the network 106 according to known protocols, whereby when the network 106 is the Internet the DNS query may be sent as one or more data packets packetized according to Internet Protocol. The DNS query is sent and received over the network 106 in step S404 using the network interface 210 of the device 102 and the network interface 306 of the DNS server 108.

In step S406 the DNS server 108 processes the DNS query using the CPU 302 and the database 304 to map the received DNS query to an IP address of the endpoint, i.e. the IP address of the server $110_1$. As described above, the DNS query is formed in dependence on the type of the client instance executed at the device 102. The DNS server 108 uses relationships between domain names and IP addresses which are stored in the database 304 to determine an IP address corresponding to a particular domain name. If the stored relationships did not distinguish between different types of client instance then DNS queries with the same domain suffix would be mapped to the same IP address, irrespective of the type of client that formed the DNS query. For example, in this case the "rst.skype.net" zone in the DNS database 306 would store the following record:

*.rst.skype.net. IN A x.x.x.x.

The * character denotes a wildcard, such that every DNS query including a domain name ending in rst.skype.net would be mapped to IP address x.x.x.x.

However, according to methods described herein, the stored relationships distinguish between DNS queries formed by different types of client instance. Therefore, DNS queries formed using a first type of client instance may be mapped to a different IP address than DNS queries formed using a second type of client instance, even if the domain suffix in the two DNS queries is the same.

In one example, clients which are executed on a particular platform with a platform ID of 10021 are to be routed to a different server endpoint than clients which are executed on platforms with other platform IDs. In this case the database 304 stores an additional record of "*.10021.rst.skype.net" to the "rst.skype.net" zone. So the "rst.skype.net" zone in the database 304 will have the following records:

*.rst.skype.net. IN A x.x.x.x and
*.10021.rst.skype.net IN A y.y.y.y

In the records stored in the database 304 a dot is considered to be a domain separator and the wildcard character is considered to match any domain basis. For each DNS query, the best match of the records in the database 304 is determined in order to map the DNS query to an IP address. Therefore, with the records shown above being stored in the database 304 every DNS query that ends with 0.10021.rst.skype.net will be mapped to the IP address y.y.y.y since this is the best match for the DNS query (i.e. the match with the record *.10021.rst.skype.net is a better match than the match with the record *.rst.skype.net). However, every other DNS query ending with ".rst.skype.net" will be mapped to the IP address x.x.x.x. The wildcard character is useful as it may be unfeasible to configure every single possible version string into the database(s) of the server(s) of the domain name system.

If a specific type of client instance is to be routed to an alternative server address in the network a record can be added to the "rst.skype.net" zone stored in the database 304, for example in following format:

402.0.2.1.10021.rst.skype.net. IN A z.z.z.z.

As there is not wildcard character present in this record only DNS queries asking exactly 402.0.2.1.10021.rstskype.net will match the record and be mapped to the IP address z.z.z.z.

In step S408 an answer to the DNS query is sent from the DNS server 108 over the network 106 to the device 102. The answer includes the IP address which was determined in step S406.

In step S410 the client instance executed at the device 102 routes data to the IP address included in the answer received from the DNS server 108 in step S408. As described above the IP address may be a real address in the network 106, such as the IP address of the server $110_1$ such that the client instance routes data to the server $110_1$. This allows the client instance at the device 102 to communicate with the server $110_1$. If a different type of client instance was executed at the device 102 then the IP address included in the answer received from the DNS server 108 in step S408 may be different, and may for example be the IP address of the server $110\text{-}2$ such that the client instance would route data to the server $110_2$ instead of to server $110_1$.

As described above, the IP address in the answer received from the DNS server 108 in step S408 may be a non-existent address in the network 106 (i.e. an address which does not relate to an entity in the network 106). In this case when the client instance routes data (e.g. a connection setup request) to the non-existent IP address, a message may be returned from network 106 (e.g. from a server of the network 106) to the client instance at the device 102 to inform the client that the IP address does not relate to an existing entity in the network 106.

It can be appreciated that since the IP address is determined based on the DNS query which itself is formed based on the type of the client instance executed at the device 102, and since the relationships stored in the database 304 distinguish between DNS queries formed based on different types of client instance, the IP address that is returned to the device 102 in the answer in step S408 is dependent upon the type of the client instance executed at the device 102. Therefore, methods described herein provide a simple way to route different types of client instances (e.g. which are executed on different platforms or which have different version or build numbers) to different server endpoints in the network 106. This is achieved without a need for complex directory services or maintenance overhead.

The ability to route different types of client instances to different endpoint addresses may be useful in many scenarios. For example, the communication system 100 may include older versions of clients which are not able to implement particular functionality whereas newer versions of clients included in the communication system 100 may be able to implement the particular functionality. In this case the older versions of clients may be routed to different server endpoints than the newer client versions so that the older versions are not required to implement the new functionality. This is achieved without preventing the newer versions from implementing the new functionality. As another example, client instances running on one type of platform (e.g. a platform implemented by a mobile phone) may be routed to different server endpoints than client instances running another type of platform (e.g. a platform implemented by a PC). Some types of client instance (e.g. badly behaving client instances) may be provided with IP addresses of non-existing entities in the network 106 such that they do not route data to real servers in the network 106. As another example, beta versions of clients can be routed to servers implementing a testing environment (or "staging environment"), so that the beta versions of the client can be tested before being implemented in the real communication system environment.

Different services may be provided to different types of client instances. Since many different types of client instance may exist in the network 106 it may be useful to provide different services to different types of client instances. This may ensure that each type of client instance in the communication system 100 is provided with adequate services, e.g. services which are suited for use with the particular type of client instance. This may for example, facilitate communication over the communication system 100 between different types of client instance. This may also allow an operator of the communication system to better control how different types of client instances can interact in the communication system 100.

The operations performed at the device 102 as described herein may be implemented by a computer program product embodied on a non-transient computer-readable medium and configured so as when executed by a processing module (e.g. the CPU 202) of the device 102 to implement the client instance. The operations performed at the DNS server 108 as described herein may be implemented by a computer program product embodied on a non-transient computer-readable medium and configured to be executed by a processing module (e.g. the CPU 302) of the DNS server 108.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, a computer-readable medium may be configured to maintain instructions that cause a computing device, and more particularly the operating system and associated hardware to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

There are described above methods relating to DNS queries for determining IP addresses. Other embodiments may relate to other types of address queries and network addresses, for example if the network 106 is not the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An address system for determining a network address of an endpoint, the address system comprising circuitry configured to perform operations that:
   identify a request from a user device of a network, the request to obtain a network address of an endpoint accessible via the network;
   identify client instance information, based on the request from the user device, the client instance information identifying at least one attribute of hardware or software in a client implementation on the user device;
   access a mapping of endpoint network addresses, the mapping associating different addresses of endpoints with attributes applicable to different types of client implementations of a plurality of user devices of the network;
   select an endpoint network address from among the different addresses, using the mapping of the endpoint network addresses, with a selection performed using the at least one attribute from the client instance information, the at least one attribute being identified from among the attributes applicable to the different types of client implementations of the plurality of user devices; and
   return a response to the user device, responsive to the request, the response including the selected endpoint network address.

2. The address system of claim 1, wherein the request is provided by an address query, wherein the at least one attribute from the client instance information includes information obtained directly from a portion of the address query, and wherein the mapping of network addresses includes a mapping of respective hardware or software client implementations to different endpoint network addresses.

3. The address system of claim 2, wherein the mapping of network addresses comprises a wildcard such that two address queries which are partially the same but are not completely identical are mapped to the same network address.

4. The address system of claim 2, wherein the address query includes a version string, the version string including at least one of a platform identifier, a version number, or a build number indicating the software in the client implementation on the user device.

5. The address system of claim 1, wherein the request includes version information based on a particular version of client software operating in the client implementation, wherein the at least one attribute from the client instance information indicates the particular version of the client software, and wherein the mapping of endpoint network addresses maps at least two different versions of the client software to different endpoint network addresses.

6. The address system of claim 1, wherein the request is a domain name query and the address system is a domain name system.

7. The address system of claim 1, the circuitry further configured to perform operations that:
   receive an additional request from an additional user device of the network, the additional request to obtain a network address for the endpoint accessible via the network;
   identify client instance information, based on the request from the additional user device, the client instance information identifying at least one attribute of hardware or software in a client implementation on the additional user device which differs from the at least one attribute of the user device;
   select a different endpoint network address from among the multiple addresses, using the mapping of the endpoint network addresses; and
   return a response to the additional user device, responsive to the additional request, the response including the selected different endpoint network address.

8. The address system of claim 1, the circuitry further configured to perform operations that:
   receive an additional request from the user device of the network, to obtain the network address of the endpoint; and
   return an additional response to the user device, responsive to the additional request, the response including the selected endpoint network address.

9. A computer-readable storage medium excluding a transitory signal, the storage medium comprising instructions that, when executed by one or more processors of a computing device, cause the processors to implement an address system for determining a network address of an endpoint, with operations comprising:
   identifying a request from a user device of the network, the request to obtain the network address of an endpoint accessible via a network;
   identifying client instance information, based on the request from the user device, the client instance information identifying at least one attribute of hardware or software in a client implementation on the user device;
   accessing a mapping of endpoint network addresses, the mapping associating different addresses of endpoints with attributes applicable to different types of client implementations of a plurality of user devices of the network;
   selecting an endpoint network address from among the different addresses, using the mapping of the endpoint network addresses, with a selection performed using the at least one attribute from the client instance information, the at least one attribute being identified from among the attributes applicable to the different types of client implementations of the plurality of user devices; and
   returning a response to the user device, responsive to the request, the response including the selected endpoint network address.

10. The computer-readable storage medium of claim 9, wherein the request is provided by an address query, wherein the at least one attribute from the client instance information includes information obtained directly from a portion of the address query, and wherein the mapping of network addresses includes a mapping of respective hardware or software client implementations to different endpoint network addresses.

11. The computer-readable storage medium of claim 10, wherein the address query includes a version string, the version string including at least one of a platform identifier, a version number, or a build number indicating the software in the client implementation on the user device.

12. The computer-readable storage medium of claim 10, wherein the request is a domain name query and the address system is a domain name system.

13. The computer-readable storage medium of claim 9, wherein the request includes version information based on a particular version of client software operating in the client implementation, wherein the at least one attribute from the client instance information indicates the particular version of the client software, and wherein the mapping of endpoint network addresses maps at least two different versions of the client software to different endpoint network addresses.

14. The computer-readable storage medium of claim 9, the operations further comprising:
- receiving an additional request from an additional user device of the network, the additional request to obtain a network address for the endpoint accessible via the network;
- identifying client instance information, based on the request from the additional user device, the client instance information identifying at least one attribute of hardware or software in a client implementation on the additional user device which differs from the at least one attribute of the user device;
- selecting a different endpoint network address from among the multiple addresses, using the mapping of the endpoint network addresses; and
- returning a response to the additional user device, responsive to the additional request, the response including the selected different endpoint network address.

15. The computer-readable storage medium of claim 9, the operations further comprising:
- receiving an additional request from the user device of the network, to obtain the network address of the endpoint; and
- returning an additional response to the user device, responsive to the additional request, the response including the selected endpoint network address.

16. A user device, comprising:
- processing circuitry configured to execute an instance of a client software to communicate data with an endpoint of a network, and request a network address of the endpoint accessible via the network; and
- network communication circuitry configured to communicate with the network and obtain the network address of the endpoint via the network, the network communication circuitry further configured to perform network communications that:
- transmit a request for the network address of the endpoint to an address system;
- identify client instance information of the user device, the client instance information identifying at least one attribute of hardware or software in a client implementation on the user device; and
- receive a response with an endpoint network address, selected by the address system;
- wherein the selected endpoint network address is determined by the address system from a mapping of endpoint network addresses that provides different addresses of endpoints according to attributes applicable to different types of client implementations of a plurality of user devices of the network, and from a selection of the endpoint network address from among the different addresses, using the mapping of the endpoint network addresses and at least one attribute from the client instance information.

17. The user device of claim 16, wherein the request is an address query, wherein the at least one attribute from the client instance information includes information obtained directly from a portion of the address query, and wherein the mapping of network addresses includes a mapping of respective hardware or software client implementations to different endpoint network addresses.

18. The user device of claim 17, wherein the address query includes a version string, the version string including at least one of a platform identifier, a version number, or a build number indicating the software in the client implementation on the user device.

19. The user device of claim 16, wherein the request includes version information based on a particular version of client software operating in the client implementation, wherein the at least one attribute from the client instance information indicates the particular version of the client software, and wherein the mapping of endpoint network addresses maps at least two different versions of the client software to different endpoint network addresses.

20. The user device of claim 16, wherein the request is a domain name query and the address system is a domain name system.

* * * * *